United States Patent [19]

Osanai

[11] 4,436,257
[45] Mar. 13, 1984

[54] REEL DRIVING METHOD FOR TAPE RECORDER AND A DRIVING MECHANISM FOR ITS PRACTICE

[75] Inventor: Akira Osanai, Tokyo, Japan
[73] Assignee: Olympus Optical Co., Ltd., Tokyo, Japan
[21] Appl. No.: 329,031
[22] Filed: Dec. 9, 1981
[30] Foreign Application Priority Data
  Dec. 15, 1980 [JP] Japan ................ 55-176876
[51] Int. Cl.³ .................. G03B 1/04; G11B 15/32
[52] U.S. Cl. ........................ 242/201; 242/208
[58] Field of Search ............... 242/198–202, 242/67.4, 192, 208, 210; 360/88, 90, 93

[56] References Cited
U.S. PATENT DOCUMENTS
  3,813,690 5/1974 Oka ........................ 360/90
  4,202,513 5/1980 Osanai ..................... 242/189
  4,252,284 2/1981 Suzuki ..................... 242/201

Primary Examiner—Leonard D. Christian
Attorney, Agent, or Firm—Frishauf, Holtz, Goodman and Woodward

[57] ABSTRACT

Disclosed is a reel driving method for a tape recorder wherein a rotatable idler is caused to engage a desired one of a pair of reel shafts by rocking a rockable support lever to drive the desired reel shaft, the idler being mounted on the support lever so that the rotatory force of a capstan shaft is transmitted to the idler. A pair of such idlers are disposed on both sides of the rocking center of the support lever so that the support lever rocks around the rocking center correspondingly to the rotating direction of the capstan shaft, which can be reversed in rotation, thereby causing one of the pair of idlers to engage the desired reel shaft.

6 Claims, 4 Drawing Figures

REEL DRIVING METHOD FOR TAPE RECORDER AND A DRIVING MECHANISM FOR ITS PRACTICE

BACKGROUND OF THE INVENTION

This invention relates to a reel driving method for a tape recorder and a driving mechanism for its practice.

There is a known reel driving method for a tape recorder in which a desired one of a pair of reels is driven by rocking a rockable support lever on which a single idler is mounted. In this conventional reel driving method, the rotatory force of a capstan shaft is transmitted to the idler by an endless belt or a gear train, for example. As the support lever is rocked, the idler is pressed against a member, e.g. a reel drum, which is coaxial with the desired reel, and thus the desired reel is driven. Since the pair of reels are substantially spaced apart from each other, however, the support lever need be fuly rocked so that the idler may be pressed against the desired reel. Such rocking motion of the support lever requires a large setting area involving substantial dead space. Thus, according to such a prior art reel driving method, it is hard to provide a compact tape recorder due to the large setting area of the reel driving mechanism. Moreover, the idler support lever is rocked by a manual input, such as the sliding force of a control button. Therefore, the prior art reel driving method requires a mechanism for transmitting the manual input to the support lever, complicating the tape recorder in structure. Further, the need of the manual input is consistent with the substitution of a touch-switch for a manual operating button, such as a push buttom or slide button, constituting a hindrance to the simplification of structure.

SUMMARY OF THE INVENTION

It is therefore a primary object of this invention to provide a reel driving method affording a compact tape recorder.

It is another object of the invention to provide a reel driving method allowing the use of a touch-switch.

It is still another object of the invention, as viewed from another point, to provide a reel driving mechanism for the practice of the aforesaid reel driving method.

To attain the primary object, according to the invention, the rocking center of a support lever is located on the middle thereof. A pair of idlers are severally disposed on both sides of the rocking center of the support lever, and the support lever is rocked around the rocking center correspondingly to the rotating direction of a reversible capstan shaft. Thus, one of the idlers is caused to engage a member coaxial with a desired one of a pair of reel shafts.

The above and further objects and novel features of the invention will more fully appear from the following detailed description when the same is read in connection with the accompanying drawing. It is to be expressly understood, however, that the drawing is for purposes of illustration only and is not intended as a definition of limits of the invention.

BRIEF DESCRIPTION OF THE DRAWING

FIGS. 1 to 4 show a reel driving mechanism according to this invention, in which:

FIGS. 1 and 3 are plan views of the reel driving mechanism in which reel shafts 27 and 28 serve as the take-up reel shaft, respectively;

FIG. 2 is a sectional view of the reel driving mechanism; and

FIG. 4 is a sectional view of a reel driving mechanism according to another embodiment of the invention.

DETAILED DESCRIPTION OF THE PREFERRED EMBODIMENT

Figure 1:
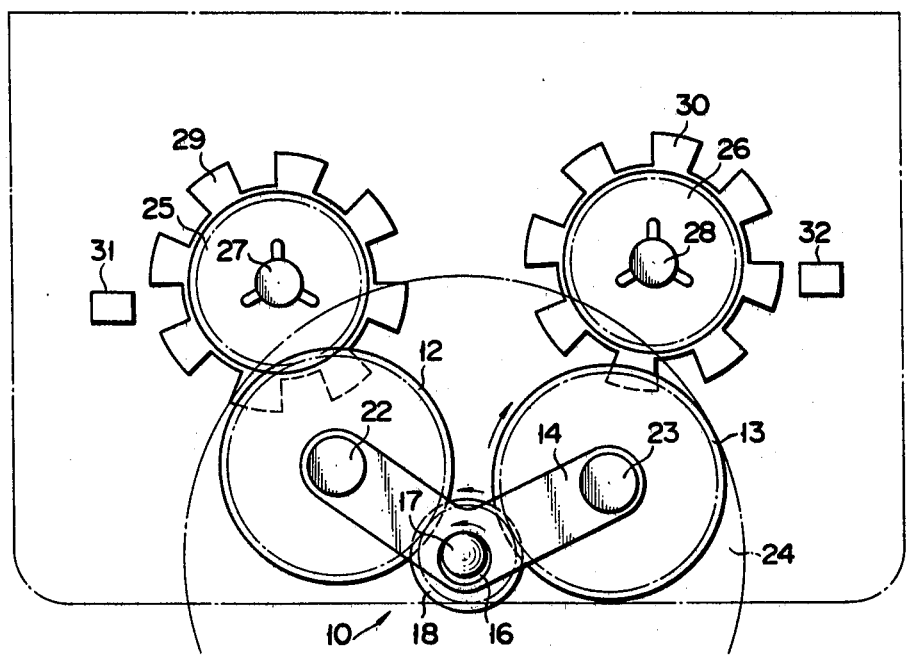
Figure 2:
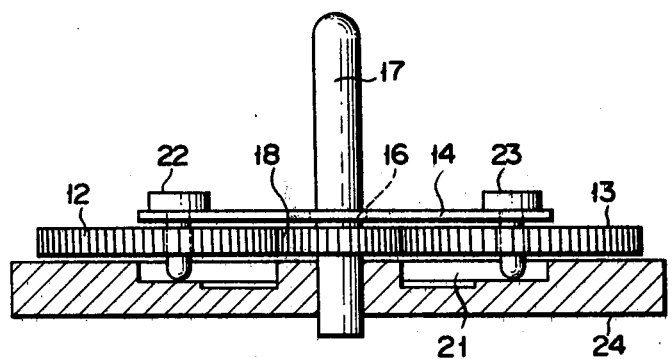

FIG. 1 shows a reel driving mechanism 10 used directly for the practice of the reel driving method of this invention. The reel driving mechanism 10 comprises a support lever 14 which rotatably supports a pair of idler gears 12 and 13. The support lever 14 includes a central guide hole 16 in which a capstan shaft 17 is fitted loosely. Fixed on the capstan shaft 17 is a capstan gear 18 which is in mesh with the idler gears 12 and 13. The respective lower ends of a shaft 22 of the idler gear 12 and a shaft 23 of the idler gear 13 abut on the top surface of a flywheel 24 which is fixed on the capstan shaft 17 (see FIG. 2). To reduce the thickness of the tape recorder, in this illustrated embodiment, an annular groove 21 is formed in the top surface of the flywheel 24 so that the lower ends of the shafts 22 and 23 abut on the bottom of the annular groove 25 forming part of the top surface of the flywheel 24.

Figure 3:
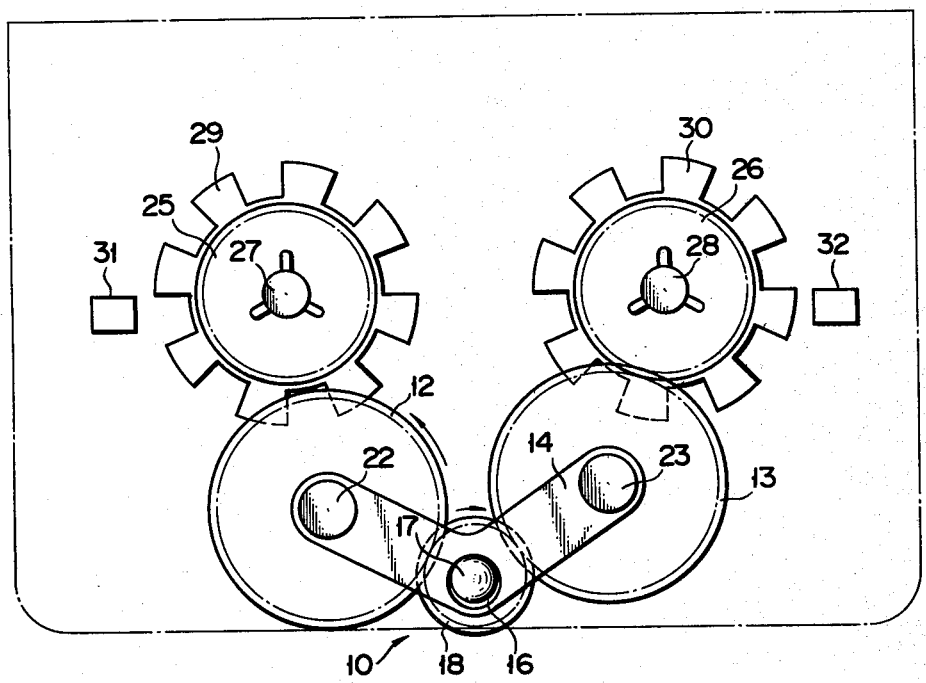

Suppose, in such an arrangement, the capstan shaft 17 is rotated in the counterclockwise direction of FIG. 1, for example. Then, the capstan gear 18 and the flywheel 24 also rotate counterclockwise. The rotatory force of the flywheel 24, more specifically the thrust thereof, acts as a frictional force on the support lever 14 through the gear shafts 22 and 23, thereby rocking the support lever 14 counterclockwise around the capstan shaft 17. Accordingly, as shown in FIG. 3, the idler gear 13 is caused to engage a reel gear 26 to drive a reel shaft 28. Hereupon, the idler gear 13 is rotating clockwise through the engagement with the capstan gear 18, so that the reel gear 26 rotates counterclockwise, and the reel shaft 28 serves as a take-up reel. It is to be understood that when the support lever 14 rocks counterclockwise, the idler gear 12 is separated from a reel gear 25 to lose power transmission between them.

The tape end is detected by conventional means, such as a combination of discs 29 and 30 disposed coaxially with the reel gears 25 and 26 and photo-reflectors 31 and 32 on the base plate. When the tape end is detected, the rotation of a motor (not shown) is reversed. When the motor rotation is reversed, the capstan shaft 17 rotates clockwise, accompanied with the capstan gear 18 and the flywheel 24. When the flywheel 24 rotates clockwise, a frictional force to rock the support lever 14 clockwise around the capstan shaft 17 is produced between the support lever 14 and the flywheel 24 by the gear shafts 22 and 23. Accordingly, the support lever 14 rotates clockwise to cause the idler gear 12 to engage the reel gear 25, as shown in FIG. 1. Then, the reel gear 25, like the capstan gear 18, rotates clockwise to serve as a take-up gear to drive the reel shaft 27.

Figure 4:
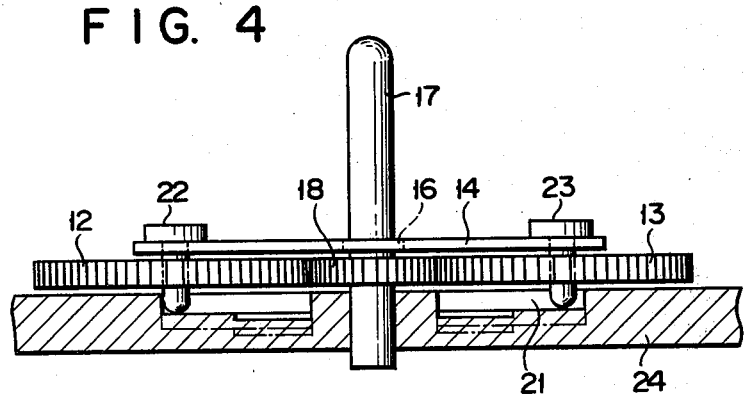

Preferably, the contact points between the gear shafts 22 and 23 and the flywheel 24 are as far from the rotation center of the flywheel 24 as possible for the transmission of the frictional force between them. As shown in FIG. 4, therefore, the side faces of the shafts 22 and 23 may be in contact with the outer side wall of the annular groove 21 in the flywheel 24. In such an arrangement, a radial force, as well as the thrust, may act as a frictional force to apply the substantial frictional force to the support lever 14, thereby enabling the support lever 14 to rock quickly. As indicated by a one-dot chain line in FIG. 4, the annular groove 21 may be formed so deep that the lower ends of the shafts 22 and 23 cannot reach the bottom of the groove 21, only with their side faces in contact with the outer side wall of the groove 21. In this case, only the frictional force attributable to the radial force is transmitted from the flywheel 24 to the support lever 14. In order to produce a great frictional force between the outer side wall of the annular groove 21 and the side faces of the shafts 22 and 23, therefore, the side wall and the side faces are preferably roughed or etched, for example.

According to the reel driving method of this invention, as described above, a pair of idlers are disposed severally on both sides of the rocking center of a support lever so that the support lever may be rocked around the rocking center correspondingly to the rotating direction of a capstan shaft which can be reversed in rotation, thereby causing one of the pair of idlers to engage a member coaxial with a desired reel shaft. In this method, the rotation angle of the support lever needed to cause the one idler to engage the member coaxial with the desired reel shaft is narrow, so that the setting space of the reel mechanism, especially that of the support lever, can be minimized. Thus, the tape recorder can be made compact.

Preferably, the lower end or side face of the shaft of each idler is brought in contact with a flywheel fixed on the capstan shaft so that the support lever may be rocked by a frictional force between the flywheel and the idler shaft. In such a reel driving method, the desired reel shaft can automatically be driven by the flywheel, the support lever, and the member coaxial with the reel shaft by reversing the rotation of the capstan shaft. Thus, the selection of the reel shaft to be driven can be performed with ease and smoothly. In this reel driving method, moreover, the support lever is rocked without any manual input, such as the sliding force of an operating button or the like. Accordingly, there is no need of a mechanism for transmitting the manual input to the support lever, so that the tape recorder is simplified in structure, and the selection operation is facilitated. Moreover, the use of a touch-switch is made feasible.

According to a reel driving mechanism for the practice of the above-mentioned reel driving method of the invention, the support lever comprises a pair of idlers disposed on both sides of its rocking center and so located as to be able to engage members coaxial with their corresponding reel shafts. Such a reel driving mechanism is simplified in structure, and can execute the aforesaid reel driving method with ease.

What is claimed is:

1. A reel driving method for a tape recorder which has a pair of reel shafts and a capstan shaft arranged for reversible rotation, comprising the steps of:
   providing a pair of idlers each with idler shafts on both sides of a rocking center of a rockable support lever;
   arranging the pair of idlers to be driven by the capstan shaft;
   fixing a flywheel to the capstan shaft and arranging the flywheel to frictionally contact a lower end or side face of each of the idler shafts; and
   rocking the support lever around the rocking center thereof correspondingly to the rotating direction of the capstan shaft by the frictional force between the flywheel and the idler shafts, thereby causing one of the idlers to engage a corresponding reel shaft.

2. A reel driving mechanism for a tape recorder including a pair of reel shafts and a capstan shaft which can be reversed in rotation, comprising:
   a flywheel fixed coaxially to the capstan shaft,
   a rockable support lever arranged over the flywheel for rocking movement about a rocking center of the support lever, and
   a pair of idlers provided on the support lever on both sides of the rocking center of the support lever and engaging the capstan shaft to be driven by the capstan shaft, wherein each of the idlers is arranged to selectively engage a corresponding one of said reel shafts, each of the idlers including an idler shaft having a lower end or side face arranged for frictional contact with the flywheel, so that the support lever rocks correspondingly to the rotating direction of the capstan shaft by the frictional force between the flywheel and the idler shafts and one of the idlers on the support lever engages the corresponding reel shaft to drive the reel shaft.

3. A reel driving mechanism according to claim 2, wherein the surface of said flywheel which faces said idlers has an annular groove coaxial with the flywheel, and the lower end of each idler shaft is in contact with the bottom of said annular groove.

4. A reel driving mechanism according to claim 2, wherein the surface of said flywheel which faces said idlers has an annular groove coaxial with the flywheel, and the side face of each idler shaft is in contact with the outer side wall of said annular groove.

5. A reel driving mechanism according to claim 2, wherein the surface of said flywheel which faces said idlers has an annular groove coaxial with the flywheel, and the lower end and side face of each idler shaft are in contact with the bottom and outer side wall of said annular groove, respectively.

6. A reel driving mechanism according to any one of claims 3, 4, 5 or 2, including an external reel gear fitted coaxially to each of said reel shafts, and wherein each idler is an idler gear arranged to be in mesh with said reel gear.

* * * * *